(12) United States Patent
Bertrand

(10) Patent No.: US 10,881,093 B2
(45) Date of Patent: Jan. 5, 2021

(54) FERROMAGNETIC PEST TRAP

(71) Applicant: Jacques C Bertrand, Gainesville, FL (US)

(72) Inventor: Jacques C Bertrand, Gainesville, FL (US)

(73) Assignee: The United States of America as Represented by the Secretary of the Navy, Arlington, VA (US)

( * ) Notice: Subject to any disclaimer, the term of this patent is extended or adjusted under 35 U.S.C. 154(b) by 516 days.

(21) Appl. No.: 15/409,572

(22) Filed: Jan. 19, 2017

(65) Prior Publication Data

US 2017/0215402 A1    Aug. 3, 2017

Related U.S. Application Data

(60) Provisional application No. 62/288,565, filed on Jan. 29, 2016, provisional application No. 62/301,774, filed on Mar. 1, 2016.

(51) Int. Cl.
*A01M 1/00*    (2006.01)
*A01M 1/02*    (2006.01)
(Continued)

(52) U.S. Cl.
CPC .............. *A01M 1/103* (2013.01); *A01M 1/00* (2013.01); *A01M 1/02* (2013.01); *A01M 1/023* (2013.01); *A01M 1/10* (2013.01); *A01M 1/106* (2013.01); *A01M 1/12* (2013.01); *A01M 1/226* (2013.01); *A01M 23/00* (2013.01); *A01M 23/02* (2013.01);
(Continued)

(58) Field of Classification Search
CPC ........... A01M 1/00; A01M 1/02; A01M 1/10; A01M 1/103; A01M 1/106; A01M 1/20; A01M 1/2005; A01M 1/2011; A01M 1/2016; A01M 23/00; A01M 23/02;
(Continued)

(56) References Cited

U.S. PATENT DOCUMENTS 4,837,969 A  *  6/1989  Demarest ............ A01M 1/2005
                                                     43/131
5,148,625 A  *  9/1992  Saleman ............... A01M 23/18
                                                     43/107
(Continued)

FOREIGN PATENT DOCUMENTS

GB      2383754 A  *  7/2003  .......... A01M 1/2016
JP   2019122317 A  *  7/2019
(Continued)

OTHER PUBLICATIONS

Translation of JP 2019-122317 (Year: 2019).*
(Continued)

*Primary Examiner* — Darren W Ark
(74) *Attorney, Agent, or Firm* — Diane P. Tso; Ning Yang; Albert M. Churilla

(57) ABSTRACT

The invention relates to methods of trapping a pest, said method comprising providing ferromagnetic particles for ingestion by the pest, and trapping the pest using one or more magnets, wherein a trapped pest has ingested and internally accumulated an amount of the ferromagnetic particles sufficient to permit immobilization of the pest using said one or more magnets. Devices for use with the methods of the instant invention are also disclosed.

33 Claims, 6 Drawing Sheets

(51) Int. Cl.
*A01M 1/10* (2006.01)
*A01M 1/12* (2006.01)
*A01M 23/00* (2006.01)
*A01M 23/02* (2006.01)
*A01M 23/14* (2006.01)
*H01F 7/02* (2006.01)
*A01N 25/00* (2006.01)
*A01M 1/22* (2006.01)
*A01M 99/00* (2006.01)
*A01N 25/34* (2006.01)

(52) U.S. Cl.
CPC ............ *A01M 23/14* (2013.01); *A01M 99/00* (2013.01); *A01N 25/002* (2013.01); *A01N 25/004* (2013.01); *A01N 25/006* (2013.01); *A01N 25/34* (2013.01); *H01F 7/02* (2013.01); *H01F 7/0205* (2013.01)

(58) Field of Classification Search
CPC ...... A01M 23/08; A01M 23/14; A01M 29/24; A01M 29/28; A01M 1/226; A01M 1/12
USPC .................. 43/107, 122, 121, 131, 132.1
See application file for complete search history.

(56) References Cited

U.S. PATENT DOCUMENTS

| | | | | |
|---|---|---|---|---|
| 5,162,014 A * | 11/1992 | Moore | A01K 51/00 | 449/2 |
| 5,501,034 A * | 3/1996 | Hazan | A01M 1/103 | 43/132.1 |
| 5,941,010 A * | 8/1999 | Latwesen | A01K 97/045 | 424/410 |
| 5,953,854 A * | 9/1999 | Hyatt | A01M 1/026 | 43/131 |
| 5,960,585 A * | 10/1999 | Demarest | A01M 1/2011 | 43/131 |
| 6,176,033 B1 * | 1/2001 | Latwesen | A01K 83/00 | 424/410 |
| 6,216,384 B1 * | 4/2001 | Dickson | A01M 1/2005 | 43/131 |
| 6,272,791 B1 * | 8/2001 | Pleasants | A01M 1/2011 | 43/131 |
| 6,594,948 B1 * | 7/2003 | Novack | A01M 1/2016 | 43/121 |
| 6,789,352 B2 * | 9/2004 | Price | A01M 1/2005 | 43/131 |
| 7,043,873 B2 * | 5/2006 | Westphal | A01M 1/2005 | 43/124 |
| 7,071,829 B2 * | 7/2006 | Gardner, Jr. | A01M 1/026 | 250/221 |
| 7,076,914 B1 * | 7/2006 | Howse | A01M 1/02 | 43/124 |
| 7,299,587 B1 * | 11/2007 | Metcalfe | A01M 1/02 | 43/121 |
| 7,343,710 B2 * | 3/2008 | Metcalfe | A01M 1/02 | 43/121 |
| 8,399,004 B2 * | 3/2013 | Howse | A01N 25/24 | 424/405 |
| 8,513,462 B2 * | 8/2013 | Nugent | A01N 43/40 | 546/281.4 |
| 8,943,742 B2 * | 2/2015 | Aiayedh | A01M 1/106 | 43/107 |
| 9,290,764 B2 * | 3/2016 | Kaletta | A01N 25/34 | |
| 9,538,740 B2 * | 1/2017 | Haik | A01M 1/103 | |
| 9,732,109 B2 * | 8/2017 | Crouse | A01N 43/00 | |
| 2004/0200128 A1 | 10/2004 | Metcalfe | | |
| 2007/0092544 A1 * | 4/2007 | Mills | A01N 65/00 | 424/405 |
| 2007/0256623 A1 * | 11/2007 | Stroud | A01K 79/02 | 116/22 A |
| 2009/0038205 A1 * | 2/2009 | Stroud | A01K 75/00 | 43/4.5 |
| 2012/0085018 A1 * | 4/2012 | Stroud | A01K 79/02 | 43/43.16 |
| 2013/0081324 A1 * | 4/2013 | Diclaro, II | A01M 1/04 | 43/131 |
| 2013/0139428 A1 * | 6/2013 | Smith | A01K 79/02 | 43/17.1 |
| 2014/0173966 A1 * | 6/2014 | Stroud | A01K 75/00 | 43/4.5 |

FOREIGN PATENT DOCUMENTS

| | | | | |
|---|---|---|---|---|
| WO | WO-0001236 A1 * | 1/2000 | ............ | A01M 1/02 |
| WO | 2010102049 A2 | 9/2010 | | |
| WO | 2015013110 A1 | 1/2015 | | |

OTHER PUBLICATIONS

O'Halloran et al. "Magnetic powder as an enhanced delivery agent for active ingredients in urban pest management products," International Pest Controls, May/Jun. 2015; 57(3) (http://international-pest-control.com/magnetic-powder-as-an-enhanced-delivery-agent-for-active-ingredients-in-urban-pest-management-products/) abstract.
International Search Report for Application No. PCT/US2017/014010, dated Apr. 6, 2017.
Gillies, M. T. et al. Bull. Entomol. Res. 1980; 70:525-532.
Turner, S. L. et al. Nature Jun. 2, 2011; 474(7349);87-91.

* cited by examiner

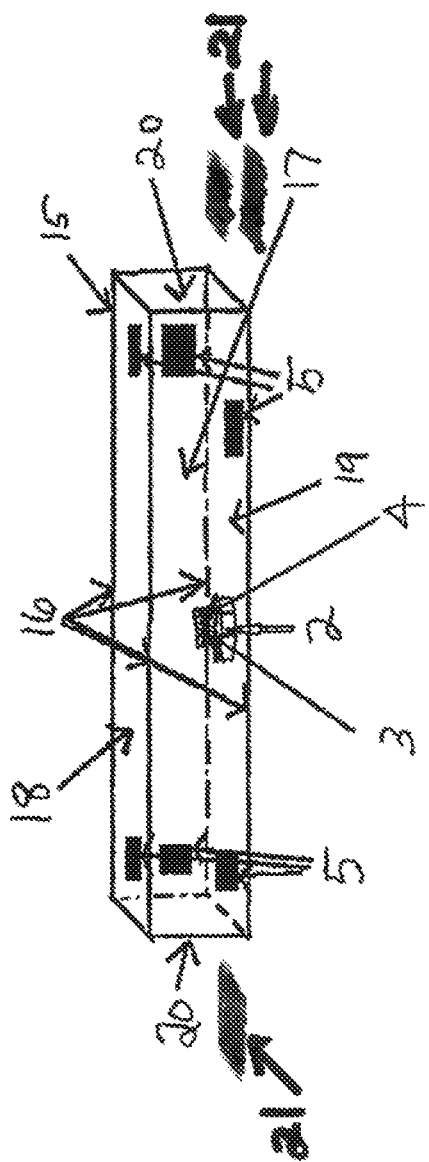

FERROMAGNETIC PEST TRAP

CROSS REFERENCE TO RELATED APPLICATIONS

The present application claims the benefit of U.S. Provisional Patent Application No. 62/288,565 filed Jan. 29, 2016, and the benefit of U.S. Provisional Patent Application No. 62/301,774 filed Mar. 1, 2016, the disclosures of which are incorporated by reference herein.

FIELD OF THE INVENTION

The inventive subject matter of the instant invention relates to methods and devices for entrapping insects and other pests using ferromagnetic particles.

BACKGROUND OF THE INVENTION

While many conventional methods and devices for pest control are effective to some degree, various disadvantages are associated with their use. For example, many conventional traps for controlling insects and other pests employ pesticides or other toxic compounds and thus not only pose environmental concerns, but also render the use of such traps unsuitable in some settings. In addition, because pesticides typically do not work immediately, a pest can exit a trap and continue to spread disease and/or harmful bacteria for some time thereafter. Also, the solvents and other materials used in the glues in sticky traps often repel insects and vermin from entering these traps.

Existing insect traps that are motorized or similarly complex in design can be expensive and inconvenient to operate. For example, motorized traps which use fans and/or lights need a power source which limits their portability; batteries used for such devices may last only a short time before they have to be recharged or replaced. Motorized fan traps are also less than ideal as such traps can disseminate insect body parts or other particulate matter, thus spreading bacteria or other harmful agents. Traps with special UV lamps are also less than ideal; they can be expensive to operate given the tendency for UV bulbs to degrade and require frequent replacement, and they often do not put out the correct wavelength of light to be truly effective. Thus, there currently remains a need for improved devices and methods for controlling insects and other pests.

BRIEF SUMMARY OF THE INVENTION

In a first aspect, the present invention relates to a method of trapping a pest, said method comprising
(a) providing ferromagnetic particles for ingestion by the pest; and
(b) trapping the pest using one or more magnets, wherein a trapped pest has ingested and internally accumulated an amount of the ferromagnetic particles sufficient to permit immobilization of the pest using said one or more magnets.

In yet another aspect, the invention relates to a device for trapping a pest, said device comprising one or more magnets. In a particular embodiment, the device further comprises ferromagnetic particles to be ingested by the pest, wherein said ferromagnetic particles are provided in an amount sufficient for ingestion by the pest of a quantity to cause immobilization of the pest with said one or more magnets.

In additional embodiments of the aforementioned aspects, the ferromagnetic particles are provided in a composition to be ingested by the pest. In a particular embodiment, the composition further comprises one or more additional ingestible substances. In a particular embodiment, the additional ingestible substance is a food material which is attractive to the pest. In a particular embodiment, the composition is in the form of a solid or a liquid. In a particular embodiment, the composition is a viscous liquid. In another embodiment, the liquid is a suspension.

In additional embodiments, the composition comprises from about 1-80% by weight of the ferromagnetic particles. In a particular embodiment, the composition comprises about 25% by weight of the ferromagnetic particles. In various embodiments, the ferromagnetic particles are less than one micron in size. In another embodiment, the particles are from about 0.01 microns to about 500 microns in size. In a particular embodiment, the ferromagnetic particles are about 0.2 microns in size.

In additional embodiments of the above aspects, the ferromagnetic particles comprise one or more substances selected from the group consisting of iron (Fe), nickel (Ni), cobalt (Co), gadolinium (Gd), and magnetic alloys.

In a particular embodiment, the magnetic alloys are selected from the group consisting of nickel-iron alloys, nickel-cobalt-iron alloys, aluminum-nickel-cobalt alloys, copper-nickel-cobalt alloys, cobalt-platinum-manganese alloys, aluminum alloys, silver alloys, copper alloys, magnesium alloys, and manganese alloys.

In a particular embodiment, the ferromagnetic particles comprise magnetic oxides and/or ferromagnetic ferrites. In a particular embodiment, the magnetic oxide is magnetite ($Fe_3O_4$).

In another embodiment, the magnets are selected from the group consisting of permanent magnets and electromagnets. In a particular embodiment, the permanent magnet is a neodymium magnet.

In particular embodiments of the aforementioned aspects, the device comprises a bait station. In further embodiments, the device comprises one or more substances which serve to attract the pest to the device. In a particular embodiment, the substance is a pheromone.

In another embodiment, the pest is selected from the group consisting of insects and rodents. In a particular embodiment, the insect is selected from the group consisting of cockroaches, ants, flies, moths, and mosquitoes. In a particular embodiment, the rodent is selected from the group consisting of mice and rats.

In additional embodiments of the device, the magnets are provided as separate components of the device, and are not physically provided in the part of the device which comprises the composition. In a particular embodiment, the method of the invention comprises placing one or more magnets along one or more possible pathways taken by the pest to and from a composition provided in the device.

BRIEF DESCRIPTION OF THE DRAWINGS

FIG. 1 depicts embodiments of a device of the instant invention. As depicted, the device comprises a base comprising a bait station and a plurality of magnets strategically located around the bait station such that a pest must pass near one of the magnets when exiting the device after ingesting the bait.

FIG. 2 depicts an embodiment of a device of the instant invention useful for trapping flying insects in the form of a device which comprises a base comprising a bait station and a plurality of magnets, wherein the magnets are suspended from the top of the enclosure inside the device.

FIG. 3 depicts a further embodiment of a device of the instant invention. As depicted, the device comprises a base with walls, bait station, a plurality of magnets, and a removable top.

FIG. 5 depicts another embodiment of the device of the instant invention. As depicted, the device depicted in FIG. 4 further comprises one or more other magnetic materials (21) wherein the other magnetic materials are strategically located outside the device in order to trap pests which may have exited the device after having ingested a meal comprising ferromagnetic particles.

FIG. 6 depicts additional embodiments of the instant invention wherein other magnetic materials (21) may be used in the device (not depicted) and strategically placed wherever pests are likely to be found but where placing the bait may not be practical.

DETAILED DESCRIPTION

Figure 1A:
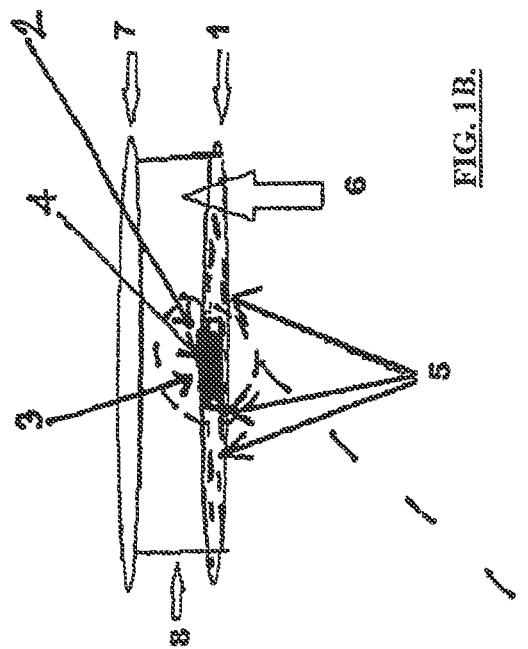
FIG. 1A depicts the device viewed from above.

While the specification concludes with the claims particularly pointing out and distinctly claiming the invention, it is believed that the present invention will be better understood from the following description.

All percentages and ratios used herein are by weight of the total composition unless otherwise indicated herein. All temperatures are in degrees Celsius unless specified otherwise. All measurements made are at 25° C. and normal pressure unless otherwise designated. The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention.

All ranges recited herein include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a pest" can mean at least one pest, as well as a plurality of pests, i.e., more than one pest.

Where used herein, the term "and/or" when used in a list of two or more items means that any one of the listed characteristics can be present, or any combination of two or more of the listed characteristics can be present. For example, if a composition is described as containing substances A, B, and/or C, the composition can contain substance A alone; B alone; C alone; A and B in combination; A and C in combination; B and C in combination; or A, B, and C in combination.

The entire teachings of any patents, patent applications or other publications referred to herein are incorporated by reference herein as if fully set forth herein.

The present invention is directed to methods and devices for controlling pests such as insects or other vermin which comprises the use of ferromagnetic particles. Specifically, it has surprisingly been discovered that a pest can be trapped by providing ferromagnetic particles for ingestion by the pest. As the pest ingests the ferromagnetic particles, the pest can internally accumulate a sufficient amount of ferromagnetic particles to attract a magnet and thus the pest can be immobilized by magnetic pull force. Accordingly, it is contemplated herein that many different types of pests may be entrapped in this manner by providing ferromagnetic particles for ingestion by the target pest and by employing one or more magnets which possess sufficient pull force to immobilize the pest once the pest has ingested the ferromagnetic particles. Without intending to be bound by theory or wishing to limit the scope of the present invention in any way, it is believed that the ingested ferromagnetic particles are not expelled by an immobilized pest because the particles are held by the magnet and thus cannot move within the alimentary tract of the pest.

Any pest that is capable of ingesting ferromagnetic particles, including, but not limited to, bait comprising ferromagnetic particles, can be trapped using this device. As used herein, "pests", "vermin" and like terms refer to creatures that are deemed undesirable, e.g., by being destructive, annoying, or injurious to health. Thus, trapping such creatures in order to control their number and/or otherwise lessen the deleterious effects of such creatures is desirable. In a particular embodiment, such creatures include insects, including but not limited to, stinging insects and/or insects which can transmit disease; e.g., wasps, ants, flies, mosquitoes, and cockroaches. Entrapping other types of insects, including insects which can cause damage to stored food, produce, or crops, is also contemplated herein. These insects are familiar to one of skill in the art and include, but are not limited to, weevils, moths, fruit flies, grasshoppers, locusts, beetles, etc. In another embodiment, it is also contemplated herein that pests other than insects may be trapped using the devices and methods of the present invention, including, but not limited to, vermin such as rodents, e.g., mice and rats.

It is contemplated herein that after entrapment, immobilized pests, particularly insects, may be left to eventually desiccate and die. The entrapped pests may be removed from the device by simply removing the magnet(s) from the vicinity of the pest. The device may thus be easily cleaned, rebaited, and reused. Alternatively, it is contemplated herein that immobilized pests can be released and relocated or otherwise disposed of without harm. To this end, in an additional aspect, it is contemplated herein that in addition to trapping pests, the devices and methods of the instant invention may be used for research purposes; e.g., an insect or other pest may be lured into a device of the instant invention and immobilized for viewing and studying. The creature could be removed from the device for further study or set free by removal of the magnets from the vicinity of the creature.

As used herein, the terms "ferromagnetic" and "magnetic" are used interchangeably and broadly include any materials which are attracted by a magnetic force. Ferromagnetic materials for use in the methods and devices of the instant invention include, but are not limited to, elements that are strongly attracted by a magnetic force such as iron (Fe), nickel (Ni), cobalt (Co), gadolinium (Gd), as well as magnetic alloys. For example, ferromagnetic materials suitable for the purposes of the present invention include magnetic iron and its alloys, such as nickel-iron alloys, nickel-cobalt-iron alloys, and magnetic oxides, such as magnetite ($Fe_3O_4$) and ferromagnetic ferrites. Cobalt and its alloys are also useful, such as, for example, aluminum-nickel-cobalt, copper-nickel-cobalt, and cobalt-platinum-manganese alloys. Moreover, it is contemplated herein that other alloys, such as certain magnetic alloys of aluminum, silver, copper, magnesium, and manganese could likewise be used with satisfactory results.

As contemplated herein, the term "ferromagnetic" broadly encompasses ferrimagnetic materials such as magnetite. In a particular embodiment, ferromagnetic oxide or "ferrites" may be used to make ferromagnetic particles for use in the methods and devices of the instant invention. In one embodiment, the use of magnetite (triiron tetraoxide; $Fe_3O_4$) is particularly contemplated herein. Magnetite is a type of iron oxide that possesses natural magnetic properties. It is familiar to one of skill in the art and is used in variety of industrial applications. Notably, magnetite is used in the treatment of iron deficiency, and as such is non-toxic. Magnetite particles suitable for use in the methods and devices of the instant invention are commercially available, e.g., as BAYOXIDE E8707H (triiron tetraoxide, $Fe_3O_4$, CAS No. 1317-61-9; Lanxess Corp., Pittsburgh, Pa.); and as MAPICO Black (845) (synthetic magnetite, triiron tetraoxide, $Fe_3O_4$, CAS No. 12227-89-3; Huntsman Pigment Co., Beltsville, Md.)

As particularly contemplated herein, the ferromagnetic particles for use in the instant invention are non-toxic to humans and pets. As such, the instant invention offers an advantage over conventional traps and methods for controlling pests which rely on the use of pesticides or other toxic substances. Specifically, the devices of the instant invention may be used as a safe alternative where the use of dangerous chemicals and pesticides is contraindicated, e.g., around livestock, children, or pets, in places where food is prepared, or in places which employ sealed air systems, e.g., on military equipment such as submarines, ships, and aircraft. Of course, while the use of pesticides may be avoided by using ferromagnetic particles in the devices and methods described herein, it is contemplated herein that the compositions disclosed herein may further comprise one or more pesticides where conditions do not contraindicate the use of such substance. As used herein, a "pesticide" is any substance which can be used for preventing, destroying, repelling or mitigating any pest, including but not limited to insects and rodents. Commercially available pesticides, e.g., insecticides and rodenticides, are familiar to one of skill in the art and are available from a variety of commercial vendors.

As understood herein, the term ferromagnetic "particles" encompasses ferromagnetic materials in any size or form (geometry). As contemplated herein, the size of the ferromagnetic particles for use in the instant invention can vary depending on the size of the pest to be trapped, i.e., the particles should be a size that can be ingested by the pest to be trapped. For example, a mosquito (average size approximately 0.3-2 cm) can use its proboscis to ingest particles about 6-8 microns in diameter, i.e., the standard size of a red blood cell; in contrast, American cockroaches (about 4 cm long on average) have chewing mouth parts and can ingest larger particles. In one embodiment, ferromagnetic particles for ingestion by insects or other pests include submicron sized particles, e.g., less than about 1.0 micron. In a particular embodiment, and as provided in detail in the below examples, it has been surprisingly discovered that magnetite particles of about 0.2 microns may be successfully ingested by cockroaches, ants, house flies, and mosquitoes. In contrast, it is contemplated herein that larger particles may be used to trap larger vermin such as rodents, e.g., particles up to about 500 microns or more, depending on the size of the pest. It is appreciated that, preferably, the size of the particle is not so great that it is unappealing in bait and/or is not easily ingested by the pest. The appropriate size magnetic particle for a target pest can be easily discerned by one of skill in the art without undue experimentation.

As understood herein, the term "magnets" broadly encompasses any material that exhibits properties of magnetism. Magnets for use in the invention described herein include any sort of magnet or combination thereof that has sufficient pull force to attract the ferromagnetic particles ingested by the pest and thus immobilize the pest using a device of the present invention. Suitable magnets include permanent magnets and electromagnets. As one of skill in the art will appreciate, permanent magnets retain their magnetism after being removed from a magnetic field, and thus are always "on." Examples of permanent magnets include, but are not limited to, neodymium magnets. Neodymium magnets are extremely strong permanent magnets familiar to one of skill in the art. Such magnets are typically made of a rare-earth alloy of neodymium, iron and boron and are quite suitable for use in the methods and devices of the instant invention. In contrast, electromagnets consist of a solenoid with an iron core, which has a magnetic field only during the time of current flow through the solenoid. While the portability of the instant invention is an advantage, it is contemplated herein that electromagnets may be used in the methods and devices of the instant invention, e.g., in situations wherein a power supply is available. Permanent and electromagnets suitable for use in the instant invention are familiar to one of skill in the art.

It is understood herein that one of skill in the art can design and construct a device comprising one or more magnets with dimensions and magnetic pull force suitable to trap any particular type of pest without undue experimentation. Specifically, the appropriate size and pull force of the magnet(s) employed in the devices of the instant invention can be determined by one of skill in the art depending on the nature (e.g., size and weight) of the pest to be trapped. One of skill in the art will appreciate that a magnetic pull force sufficient to immobilize an ant or moth may be insufficient to immobilize a cockroach; a mouse or other type of rodent may require a magnetic pull force significantly greater than that used to immobilize an insect.

Similarly, it is understood herein that magnets of different sizes may be employed, including magnets which are large enough to immobilize more than one pest. For example, a multitude of insects may be entrapped using one or more magnets or pieces of magnetic sheeting having only a relatively weak magnetic pull force, while one or more magnets having several pounds of magnetic pull force and a large surface area may be required to immobilize one or more rodents. Magnets of suitable pull force and surface area are commercially available and can be readily employed in the devices of the instant invention.

Similarly, magnets in a variety of shapes and forms may be used in the devices of the instant invention. For example, depending on the design and intended use of the device, magnets may be employed in various forms, e.g., disks, cylinders, blocks, rings, spheres, or flexible magnetic sheeting. Magnets may be coated with stainless steel, plastic or rubber, plated with nickel, etc. Magnets include, but are not limited to, conventional magnetic pieces of iron or steel as well as materials impregnated or coated with magnetic materials. Magnets for use as contemplated herein may be obtained and/or custom designed by a variety of commercial vendors, e.g., K&J Magnetics, Inc. Pipersville, Pa.; Magna-Terra, LLC Blue Springs, Mo.; Magnum Magnetics Corp., Marietta, Ohio; Dura Magnetics, Inc., Sylvania, Ohio.

One of skill in the art will appreciate that strong magnetic fields may damage electronic devices and can also interfere with certain medical devices such as pacemakers and defibrillators. Thus, it is contemplated herein that, in some embodiments, a device of the instant invention may incorporate "shunts" around the magnets, e.g., thin sheets of steel or other iron-based materials, in order to shield the magnetic field and thus keep it from penetrating outside of the device.

As used herein, "providing" ferromagnetic particles to a pest broadly encompasses any means of presenting or administering ferromagnetic particles for ingestion by a pest to be trapped. While a pest lured into a device of the instant invention might be inclined to ingest ferromagnetic particles alone, the methods of the present invention also encompass providing the pest with ferromagnetic particles in a manner which facilities ingestion by the pest. For example, in a particular embodiment, the ferromagnetic particles are provided in the form of a composition formulated to be attractive as bait to be ingested by the target pest.

As understood by one of skill in the art, "bait" refers to a substance which can be used to lure a pest to a trap. As discussed above, as contemplated herein, bait for use in the methods of the instant invention includes, but is not limited to, compositions comprising ferromagnetic particles to be ingested by the pest. In a particular embodiment, the composition comprises ferromagnetic particles in combination with one or more additional ingestible substances.

As used herein, an "ingestible substance" includes any material that might be consumed by a pest. These materials include, e.g., ingestible nonfood materials as well as ingestible food materials that are attractive to the pest. Ingestible nonfood materials for use in the instant invention include substances that a pest may be inclined to ingest but which are not naturally intended for consumption. These materials include, e.g., many non-organic substances. For example, a rat may be keen to chew and ingest a composition comprising man-made materials such as plastics or rubber. Roaches will also eat a wide variety of materials, including typically nonfood materials such as paper and glue. As contemplated herein, ingestible nonfood materials, and/or chemical components thereof, may be used as bait, alone or in combination with one or more other substances, e.g., pheromones or other natural or synthetic attractants, to enhance appeal.

In contrast, as understood herein, ingestible food materials include substances that not only might make up a part of the pest's natural diet, but also substances intended for consumption by humans and/or by domesticated animals. For example, since many rodents are omnivorous scavengers, rodent bait for use in the methods and devices of the instant invention may comprise a wide variety of food materials, e.g., not only fruits, vegetables, and nuts, but also processed foods intended for human consumption, or even commercial dog or cat food. Moreover, as one of skill in the art will appreciate, the meaning of the term "food material" is considered with regard to the diet of a particular target pest. For example, house flies will eat almost anything, including items which might not typically be consumed as food by other pests, e.g., manure. Thus, in a particular embodiment, the ingestible substance is a food material which is attractive to the pest to be trapped.

Food materials attractive to various pests are familiar to one of skill in the art. For example, insects and rodents may be attracted to various foods comprising, for example, nuts, grains, cereal, flour, herbs, pasta, bran, sugar, molasses, peanut butter, citrus pulp or other fruit material, cheese, bacon, and animal fats. One or more of such materials, including synthetic substances comprising such materials and/or odors or essences thereof, may be used in the compositions of the instant invention.

It is contemplated herein that ferromagnetic particles can be incorporated and well distributed within various bait compositions and thus may be provided in a variety of forms, e.g., as pastes, spreads, or other solids. In a particular embodiment, spreads comprising ferromagnetic particles in combination with substances such as peanut butter and other nut butters which are extremely attractive to insects and rodents may be used as bait in the methods of the instant invention. In addition to pastes and spreads, it is also contemplated herein that ferromagnetic particles can be incorporated and well distributed within various solid bait compositions such as breads, cakes, muffins, biscuits or similar grain-based products using conventional methods.

A composition for use in the instant invention may also be a liquid which comprises ferromagnetic particles. In one particular embodiment, the composition is a liquid comprising an ingestible substance in combination with ferromagnetic particles. In a particular embodiment, such ingestible substances include sweet liquids which are particularly attractive to a variety of pests as a source of nourishment and may be employed as effective bait in the methods and devices disclosed herein. As understood herein, liquids perceived by humans as "sweet" which may be used as bait include, e.g., honey, soft drinks, fruit juices, nectars, molasses, corn syrup and/or other man-made or natural sugar-based liquid substances.

In addition to the foregoing, attractive toxic sugar baits (ATSB) comprising an oral toxic component (e.g., boric acid), a sugar component, and a scented component attractive to mosquitoes or other insects are well known to one of skill in the art (Westham Ltd., Tel Aviv, Israel). It is contemplated herein that similar compositions further comprising ferromagnetic particles (with or without addition of an oral toxic component), may be used in the methods and devices of the instant invention. Such compositions may be combined with additional ingredients to enhance the consistency and/or the stability of the formulation, e.g., by making it more viscous and thus facilitating the suspension of ferromagnetic particles.

As discussed above, magnetic particles and one or more ingestible substances (e.g. food materials) may be blended together to form a bait composition. Specifically, it is contemplated herein that the compositions are formulated and prepared in a manner such that the ferromagnetic particles are well distributed in the bait to increase the amount of the ferromagnetic particles ingested by the pest. This may be achieved by one of skill in the art using conventional methods. For example, while ferromagnetic particles may be provided in water and thus lapped up or otherwise ingested by a pest, in particular embodiments, the compositions of the instant invention may be in the form of a stable liquid suspension in which ferromagnetic particles are well dispersed and do not have a tendency to settle out. Viscous liquids in which ferromagnetic particles are homogenously or nearly homogenously distributed are also particularly contemplated herein. These include, for example, fruit spreads, e.g., jams, jellies, and preserves which are particularly useful for creating an appealing bait of sufficient consistency in which to suspend ferromagnetic particles. Fruit spreads suitable for use with the instant invention include a wide variety of commercial formulations including, but not limited to, formulations which may or may not comprise additional cane sugar. These include, e.g., fruit spreads available from BIONATURAE (North Franklin, Conn.) and J. M. Smucker Company, (Orrville, Ohio.) If necessary, liquid suspensions and viscous liquids comprising ferromagnetic particles for use as bait may be combined with additional ingredients to enhance the stability of the formulation. For example, additional substances including, but not limited to, viscous liquids such as molasses or corn syrup may be employed to enhance the stability of a liquid (e.g., water based) suspension or other composition of the instant invention. Bait compositions (solids or liquids) may further comprise other components including, e.g., filler materials and/or preservatives.

Compositions for use as bait particularly suited for a pest to be entrapped may be prepared by one of skill in the art according to conventional methods and without undue experimentation. As one of skill in the art will appreciate, various factors for consideration in the creation of a composition for use in the instant invention include the size and type of pest to be entrapped, the type and physical nature of any ingestible substance that might be useful to lure the pest, and also the amount, physical form and/or size of the ferromagnetic particles and magnets to be used to immobilize the pest.

In one embodiment, to facilitate the preparation of a composition comprising ferromagnetic particles, the particles may be in the form of a fine powder which may be easily incorporated into the composition and ingested by the pest. In a particular embodiment, a powder comprising submicron size ferromagnetic particles may be used. The use of fine powders of ferromagnetic particles may be particularly suited for preparing a composition to be ingested by insects; larger magnetic particles may be suitable to trap larger pests, including, but not limited to, rodents. It is also contemplated herein that ferromagnetic particles may be coated with a composition comprising one or more ingestible substances, e.g., food materials, and thus provided to a pest according to the methods and devices of the instant invention. Alternatively, a composition comprising one or more ingestible substances such as food materials may be finely coated with a magnetic material, e.g., dusted with a ferromagnetic powder.

Without intending to be bound by theory, one of skill in the art will appreciate that a "sufficient amount" of ferromagnetic particles to attract a magnet and thus immobilize a pest using magnetic pull force can vary depending on the type and size of the pest, the pull strength of the magnet, and the attractiveness of the ferromagnetic materials to the magnet. Accordingly, one of skill in the art can formulate a composition comprising an appropriate weight percentage of magnetic particles, and can select appropriate magnets to immobilize the pest, without undue experimentation.

Ideally, the compositions for use in the instant invention will include ferromagnetic particles in a weight percentage such that an amount of bait typically ingested by the pest in a single feeding will contain enough ferromagnetic particles to permit immobilization of the pest, but not so much that the bait is disagreeable or unappealing to the pest. As contemplated herein, compositions comprising from about 1-80% by weight, particularly 1-50% by weight, more particularly 10-70% by weight of ferromagnetic particles may be used in conjunction with one or more magnets, e.g., having a one pound pull strength or greater, to entrap pests using the methods and devices of the instant invention. In one particular embodiment, as demonstrated by the below examples, various types of insects are effectively immobilized by a ½ inch wide, ⅛ inch high neodymium magnet having a one pound pull strength after ingesting a single feeding of a bait comprising 25% by weight of a ferromagnetic powder made up of 0.2 micron sized particles. One of skill in the art will appreciate that the actual weight percentage of ferromagnetic particles in a composition of the instant invention may vary depending on the type and/or size of magnetic particle and/or strength of the magnet used; e.g., the larger the particle and/or the stronger the magnet, the lower the weight percentage of ferromagnetic particle that may be needed in the composition for immobilization.

As discussed above, the size of a particle may vary depending on the size of the pest to be entrapped. It is contemplated herein that ferromagnetic particles (e.g., made of magnetite) for use in the instant invention ranging in size from about 0.01 microns to about 500 microns or more may be used; the larger the pest, the larger the size of ferromagnetic particle that may be employed. Ferro magnets and rare earth (e.g., neodymium) magnets of any suitable pull strength, e.g., ranging from about less than a pound to from about several hundred pounds or more can be used in the methods and devices of the present invention, depending on the size of the pest that is targeted, i.e., the greater the size of the pest, the larger the magnetic pull strength to be employed.

One of skill in the art will appreciate that some pests such as rats only eat small amounts of new foods. Thus, it is contemplated herein that the devices of the instant invention may be used for a period of time with a bait composition which does not contain ferromagnetic particles so that the pest may grow accustomed to eating the bait in the device. Once the pest has become comfortable ingesting the bait, the same composition comprising ferromagnetic particles may be offered as bait with the expectation that the pest will be more likely to ingest a quantity of ferromagnetic particles in a single feeding which is sufficient to immobilize the pest.

Alternatively, bait may be constructed having a plurality of layers, e.g., in the form of a cake or block, such that bait without ferromagnetic particles is presented to the pest at first, i.e., in upper layers. As the pest ingests the bait over time, lower layers of bait comprising ferromagnetic particles will become available for ingestion by the pest.

In addition to providing ferromagnetic particles in combination with edible materials or other tempting ingestible substances in compositions as bait, additional substances may be used to attract pests to the devices of the instant invention. Such additional substances include, but are not limited to, substances not typically meant for ingestion by the pest, e.g., food lures which may be used in conjunction with the device as a sensory stimulant, e.g., a substance having an odor associated with the pest's food, but which is not accessible to the pest for actual ingestion. In addition, it is contemplated herein that chemical stimulants such as a natural or synthetic pheromone attractants, e.g., in the form of pheromone-impregnated lures, may be used with the devices of the instant invention. Pheromones for attracting pests are familiar to one of skill in the art and are commercially available. For example, numerous insect lures and pheromones are available from Alpha Scents (West Linn, Oreg.); various rodent lures are available from JF Oakes LLC (Yazoo City, Miss.)

In addition to food lures and pheromones, other conventional methods may be employed to attract pests to the devices of the instant invention. These include, e.g., designing the devices to incorporate the use of one or more colors, visual patterns, scents and/or other sensory signals that may be used to attract a target pest. The use of such colors, visual patterns, scents, and sensory signals as lures are familiar to one of skill in the art. For example, US Pub. No. 20130081324 teaches that a black line over a blue background can attract flying insects. In addition, it is well known that mosquitoes are attracted to carbon dioxide, octanol, and lactic acid, among other chemicals, one or more of which can be used as lures in the traps of the instant invention. See, e.g, Gillies, et al., *Bull Entomol Res.* 1980; 70:525-532; Turner et al., Nature 2011 Jun. 2; 474(7349): 87-91. Similarly, volatile odorants that activate the $CO_2$ neuron in mosquitoes or otherwise mimic $CO_2$ activity can also be used as insect lures such as described in WO 2010/102049. These chemicals include, e.g., 4-6 carbon aldehydes (e.g., butanal, pentanal, hexanal); 5-8 carbon alcohols (e.g., pentanol, hexanol, cyclohexanol, Z3-hexen-1-ol, Z2-hexen-1-ol, 1-hexen-3-ol, 1-hepten-3-ol, 3-hexanol, 2-hexanol); 3-8 carbon mono- or di-ketones (e.g., butanedione, 2,3-butanedione, pentanedione) or a combination thereof.

Because the instant invention uses magnetic pull force to immobilize a pest, the devices of the present invention can be a relatively simple affair structurally. They may be formed from a variety of materials and/or combination thereof and may be in a variety of configurations. Indeed, any number of possible trap designs which provide ferromagnetic particles to the pest and which permit immobilization of the pest with one or more magnets after the pest ingests the ferromagnetic particles are contemplated herein. For example, in one possible embodiment, it is contemplated herein that a device of the instant invention comprises one or more bait stations in which the ferromagnetic particles may be presented to the pest. The bait stations may take any form which facilitates the presentation of ferromagnetic particles to the pest, e.g., a depression or cup, or a raised platform on the base, or a cup or other receptacle suspended from a surface inside the device. In a particular embodiment, the bait station may be made out of any suitable non-magnetic material, e.g., plastic or a diamagnetic metal such as stainless steel or some other metal or alloy. The bait station may further comprise a material suitable to shield the bait station from any magnetic pull force provided in the device to ensure the ferromagnetic particles remain in the bait station for consumption by the pest.

Magnetic portions of a device of the instant invention may comprise one or more individual magnets, and/or may comprise a material, e.g., a plastic, impregnated with a magnetic material, and/or may be coated with one or more suitable magnetic sheets or strips which can attract the ferromagnetic particles in the bait upon ingestion by the pest. As discussed above, it is contemplated herein that the materials used in the device and/or the design of the device are such that the magnetic pull force used to immobilize the pest does not interfere with the ability of the pest to ingest the ferromagnetic particles provided in the device.

Particular embodiments of devices contemplated herein include, e.g., open feeding stations comprising a base and one or more bait stations provided thereon; devices comprising a base, a top affixed to the base by pillars or columns, and further comprising one or more bait stations; devices comprising a base with side walls, a removable cover which securely fits to the base, and one or more bait stations which may be provided on the base, and/or suspended on the inside of the cover. Additional embodiments include, but are not limited to, devices in the form of enclosures comprising housings of various shapes, e.g., conventional rectangular or cylindrical "tube" traps with openings at either end and further comprising one or more bait stations and magnets within the device.

Devices contemplated herein include devices comprising one or more openings for permitting pest entry/exit, and one or more magnets for immobilizing the pest. In some embodiments, the device comprises one or more magnets for immobilizing the pest within the device; in other embodiments, the device comprises one or more magnets wherein the magnets are located not only within the device but are also strategically located outside the device in order to trap pests which may have exited the device after having ingested a meal comprising ferromagnetic particles. In yet another embodiment, the device comprises magnets wherein the magnetic material to entrap the pest is strategically located outside of the device.

As further contemplated herein, the devices may be in the form of a unitary piece, or may comprise a plurality of pieces which may be assembled prior to use and easily disassembled for cleaning and/or rebaiting the device. For convenience, the device may comprise one or more handles affixed to the device. The base of a device may be in the form of a tray, e.g., less than or about one or more inches thick, or the base may further comprise side walls, e.g., walls of less than or about one or more inches in height. The side walls may be of a size and form useful to protect the bait inside the device from water or other elements, e.g., when the device is used outdoors.

Figure 1B:
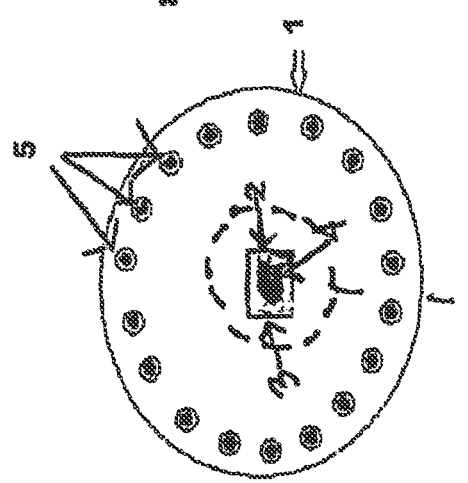
FIG. 1B depicts a side view of the device of FIG. 1A further comprising a top portion supported by pillars attached to the base of the trap, and comprising open sides permitting easy access to the bait and magnets.
Figure 1C:
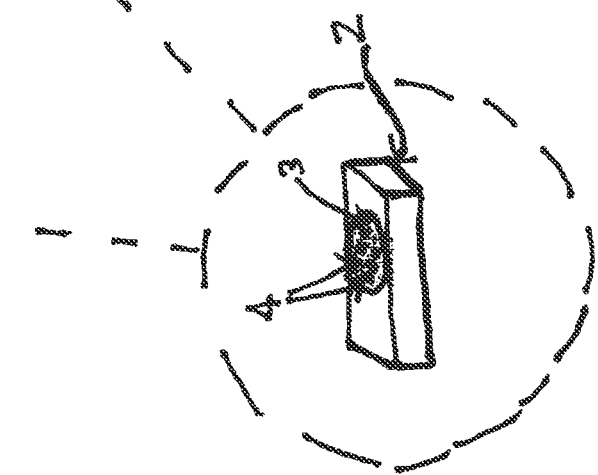
FIG. 1C depicts an enlarged view of just the circled portions of FIGS. 1A and 1B depicting an embodiment of the bait station and bait comprising ferromagnetic particles.

For example, as depicted in FIG. 1, in a particular embodiment, the device may comprise a base 1 on which is provided a bait station 2 comprising bait 3 comprising ferromagnetic particles 4 and a plurality of magnets 5 located in the perimeter of the base 1 which thus surround the bait station 2 on all sides and which provides a magnetic pull force which is capable of attracting the ferromagnetic particles 4 in the pest after ingestion. As depicted in FIG. 1A (viewed from above), the device may be an open feeding station, e.g., without side walls or a top, and a pest may freely enter the device and have easy access to the bait 3 from a variety of possible directions. Alternatively, in another embodiment as depicted in FIG. 1B (side view), the device may have open sides 6 and further comprise a top 7 affixed to the base 1, e.g., by supporting pillars or columns 8. A pest which attempts to exit the devices depicted in FIG. 1 after having consumed an amount of bait 3 sufficient for the pest to be attracted by the magnetic pull force in the devices will be immobilized by one of the magnets 5 located in the device. The magnets 5 may be arranged in any manner or fashion in the device, e.g., as a single ring in the perimeter of a circular base 1 as depicted in FIG. 1, and/or in the form of a plurality of concentric circles or other formation arranged around or in the bait station 2. FIG. 1C depicts an enlarged view of just the circled portions in FIG. 1A and FIG. 1B comprising a possible embodiment of a bait station 2, bait 3, and ferromagnetic particles 4 (not to scale).

Figure 2A:
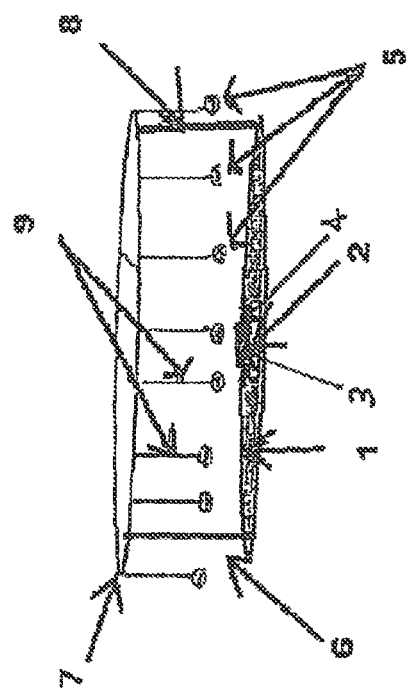
FIG. 2A depicts the arrangement of suspended magnets viewed from the inside of the top.
Figure 2B:
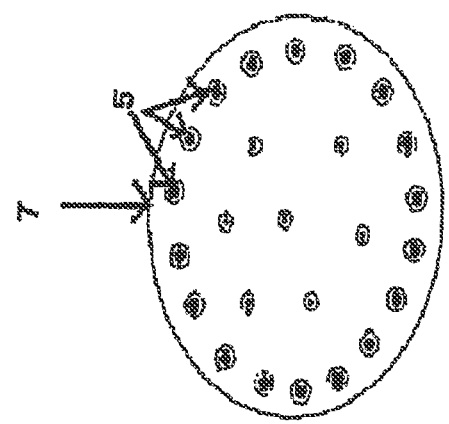
FIG. 2B depicts a side view of the device.

Alternatively, in a particular embodiment depicted in FIG. 2, a device such as provided in FIG. 1B comprising a base 1 on which is provided a bait station 2 comprising bait 3 comprising ferromagnetic particles 4, with open sides 6 and further comprising a top 7 affixed to the base 1, e.g., by supporting pillars or columns 8, may further comprise a plurality of magnets 5, wherein the magnets 5 are suspended from the top of the device 7, e.g., by a suitable filament or other means 9, to trap flying insects. FIG. 2A depicts the arrangement of suspended magnets 5 viewed looking at the inside of the top 7; FIG. 2B depicts a side view of the device. It is contemplated herein that such device may optionally further comprise additional magnets arranged on the base such as depicted in FIG. 1 to immobilize crawling insects as well. See FIG. 1C for an enlarged view of a possible embodiment of a bait station 2, bait 3, and ferromagnetic particles 4 depicted in FIG. 2B.

Figure 3A:
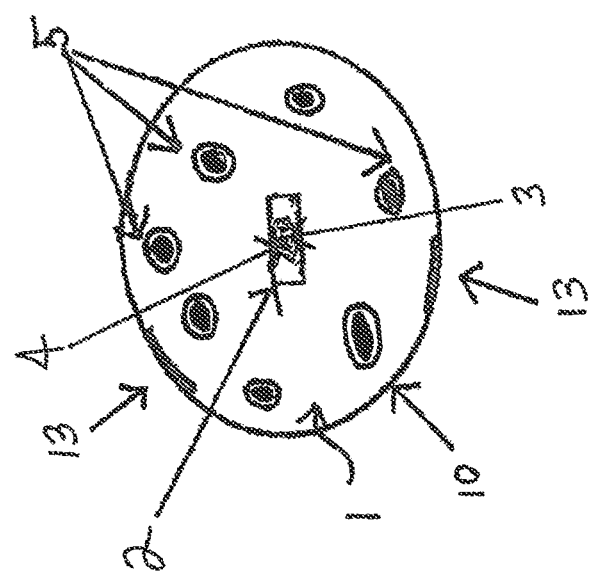
FIG. 3A depicts a possible base of a device (viewed from above) comprising walls, a bait station, and a plurality of magnets, including magnetic sheets.
Figure 3B:
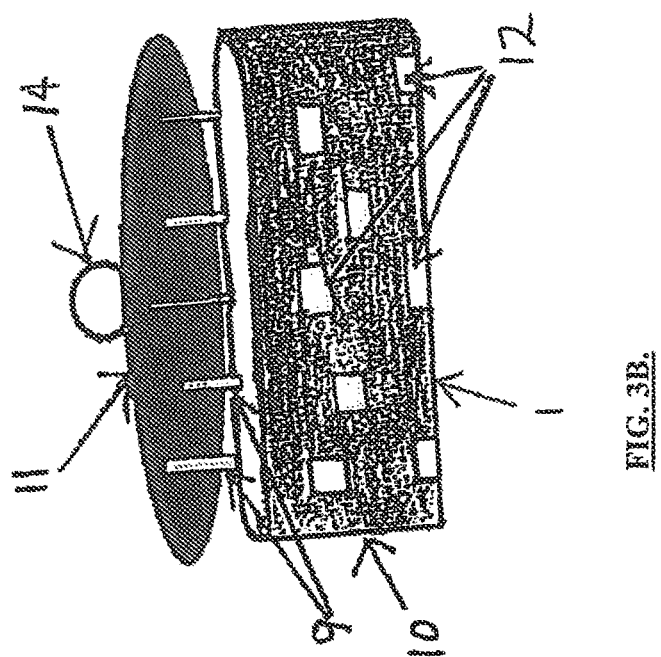
FIG. 3B is a side view of the device depicting the base with a plurality of openings in the walls and a removable top comprising magnets, including magnetic strips, suspended from the inside of the top.

In another embodiment, as depicted in FIG. 3, a device comprising a base 1 comprising side walls 10, and bait station 2 comprising bait 3 comprising ferromagnetic particles 4 may further comprise a removable cover 11 to form an enclosed device. As contemplated, such device may comprise one or more openings 12 by which a pest can access the bait station 2 by crawling or flying through the opening(s) 12. The device may comprise magnets 5 strategically affixed to the base 1, base side walls 10, and/or suspended and/or otherwise affixed to the inside of the cover 11. In a particular embodiment, the inside of the base side walls 10 and/or cover 11 may be lined with one or more magnets in the form of flexible magnetic sheets or strips 13 in order to entrap an insect which attempts to crawl or fly out of the device after consuming the bait 3. In a particular embodiment, the device may comprise one or more magnets 5 or magnetic sheets or strips 13 suspended from the cover 11 at varying heights to increase the likelihood of entrapping flying insects attempting to exit the device. The removable cover 11 may be in any shape, e.g., in the form of a dome or box-shaped, and can be designed to easily and securely fit over a base 1 with side walls 10 of any shape or dimension. As depicted, the cover 11 may comprise a handle 14 and may be easily removed to access the inside of the device for maintenance, e.g., removing pests and/or refilling the bait station 2. FIG. 3A depicts the uncovered base 1 comprising side walls 10 viewed from above; FIG. 3B depicts a side view of the device with a cover 11. See FIG. 1C for an enlarged view of a possible embodiment of a bait station 2, bait 3, and ferromagnetic particles 4 depicted in FIG. 3A.

Figure 4:
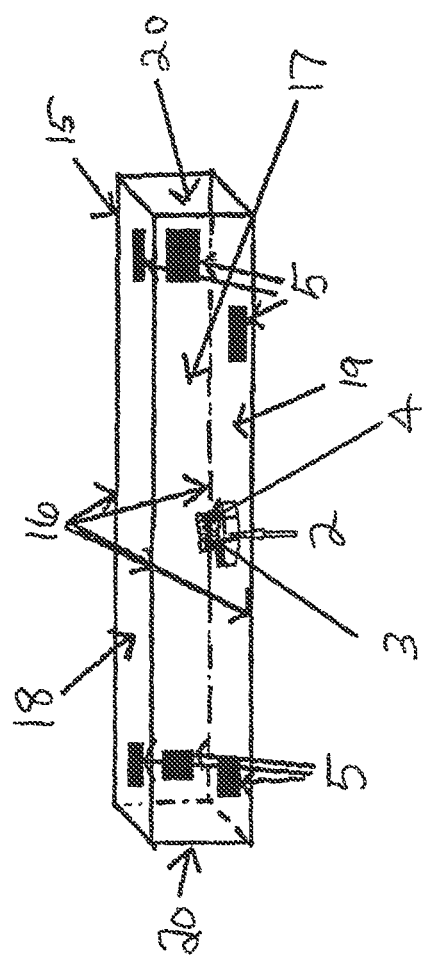
FIG. 4 depicts another embodiment of the device of the instant invention. As depicted, the device is an enclosure similar to a conventional "tube" trap which comprises a housing. As depicted, the device comprises a frame with base, top, walls and one or more openings through which the pest may enter the device. As depicted, the device also comprises a bait station and a plurality of magnets situated such that a pest must pass near one of the magnets when attempting to exit the device.

A further embodiment of a device of the instant invention is depicted in FIG. 4. As depicted in this embodiment, the device may comprise a housing 15 comprising a frame 16 comprising side walls 17, a top 18, and a base 19. In particular embodiments, the device may be in any form, e.g., in the form of a square, rectangular, cylindrical, or tubular housing. The device may further comprise a bait station 2 within the housing 15 comprising bait 3 comprising ferromagnetic particles 4. The side walls 17, top 18, and/or the base 19 of the frame 16 of the housing 15 comprises a magnetic material, e.g., one or more magnets 5 capable of attracting the ferromagnetic particles 4 after ingestion in bait 3 to be provided in the bait station 2 of the device. The bait station 2 may take any manner of form, and may be located anywhere within the housing 15, e.g., provided in the base 19 of the device, affixed to a side wall 17 of the device, or even suspended within the device. See FIG. 1C for an enlarged view of a possible embodiment of a bait station 2, bait 3, and ferromagnetic particles 4 depicted in FIG. 4.

The device depicted in FIG. 4 further comprises one or more openings 20 to permit entrance of a pest. The magnets 5 are located in the device such that the pest must pass in the vicinity of the magnetic material while attempting to exit the device through an opening 20. Thus, in a particular embodiment contemplated herein, pests may enter the device, and having ingested a sufficient quantity of bait 3 to be immobilized by the magnetic pull force in the device, will subsequently be entrapped by a magnet 5, e.g., located on the side walls 17, top 18, and/or on the base 19 of the housing 15, and/or on a suspended magnet 5 (e.g. disc or strip), when attempting to exit the device.

As discussed above, it is contemplated herein that the devices of the instant invention comprise one or more magnets which provide the pull force necessary to immobilize a pest. As envisioned, magnets for use with the devices of the instant invention may be physically associated with the device, e.g., provided within the device affixed to a surface of the device and/or impregnated in a material which is used to make the housing or other part of the device, e.g., a lid or base. In addition, it is also contemplated herein that the devices may comprise one or more magnets wherein the magnets are provided as separate components of the device (21), i.e., not necessarily part of the same structure which contains the ferromagnetic particles and/or the bait station. See FIG. 5. Accordingly, the instant invention encompasses methods and devices wherein the magnetic pull force necessary to immobilize a pest comes from one or more magnets that are in close proximity to, but separate from, the part of the device containing the ferromagnetic particles. Thus, it is contemplated herein that magnets that are adjacent to the bait station, but that are not necessarily physically incorporated within or on the device with the bait station, may be used with the devices of the instant invention. Thus, the pest need not necessarily be trapped within the device, but could be trapped in a vicinity near the device, e.g., within a desired perimeter around the device, by strategically locating one or more magnets near the device accordingly. For example, as contemplated above, one or more magnets could be placed along a plurality of possible pathways taken by the pest to and from the bait station. In a particular embodiment, one or more devices comprising ferromagnetic particles may be placed in areas frequented by pests (indoors or outdoors), and magnetic materials strategically placed nearby. Such devices may comprise ferromagnetic particles provided in simple bait stations, e.g., open feeding stations.

Figures 6A, 6B, 6C:
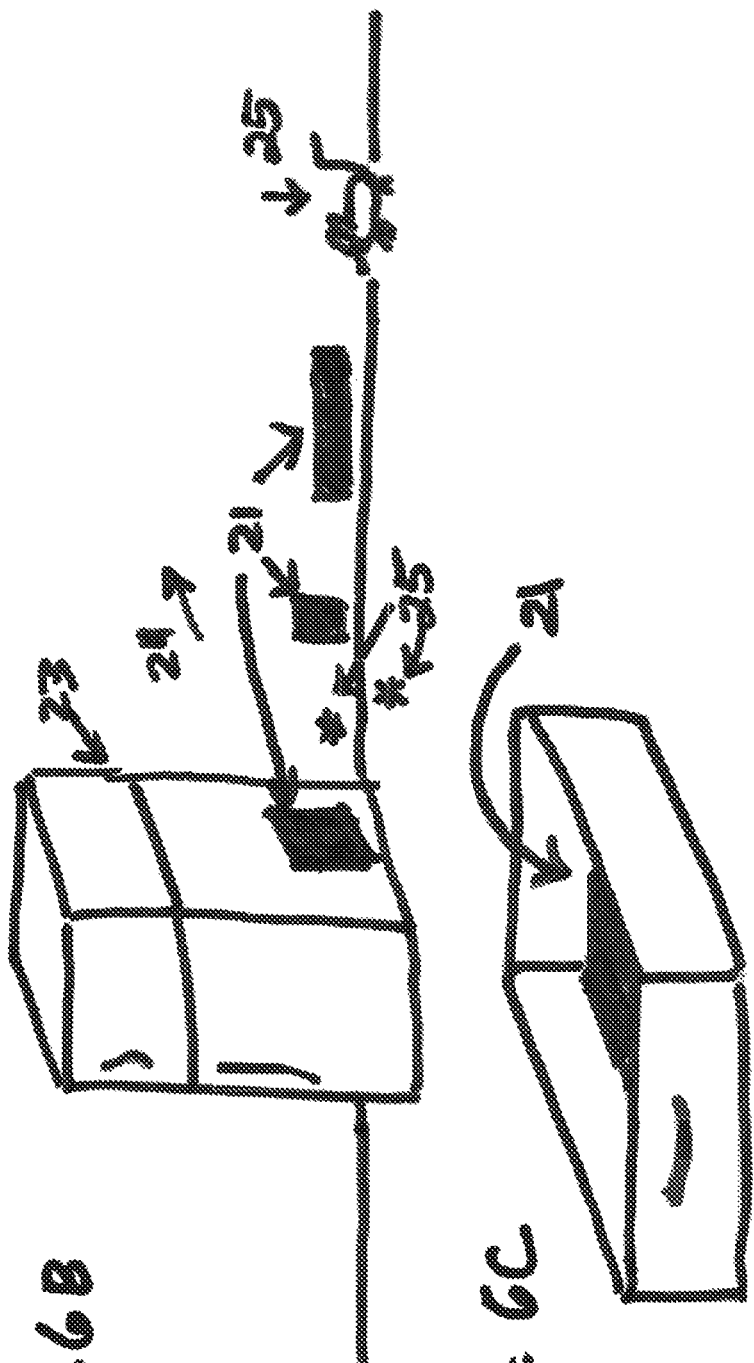
FIG. 6A depicts other magnetic materials (21) in the form of magnetic strips wrapped around a plumbing fixture (22).
FIG. 6B depicts other magnetic materials (23) affixed vertically alongside appliances (23) and walls (24) where an insect or other pest (25) might crawl.
FIG. 6C depicts other magnetic materials (21) in the form of a magnetic sheet used in place of conventional shelf paper or a shelf liners.

As discussed above, various forms of magnets may be used in the methods and devices of the instant invention, including magnets that are custom fabricated into various sizes and shapes. For example, in particular embodiments, devices comprising bait stations may be used in homes or other buildings in conjunction with magnets in a variety of configurations, e.g., magnets in the form of magnetic strips or sheets strategically placed near the bait station where pests are likely to be found but where placing the bait may not be practical, e.g., along counter tops or base boards, or wrapped around pipes or other plumbing fixtures. See FIG. 6A. In particular embodiments, magnetic materials with self-adhesive backing may be used and strategically placed wherever pests may be found, e.g., not only in cupboards, behind appliances, on pipes, in crawl spaces, etc., but also affixed under counter tops or affixed vertically alongside appliances, walls or other structures etc. where an insect or other pest might crawl. See FIG. 6B. In addition, hook and loop fasteners such as VELCRO may be used to affix the magnets to any desired location, e.g., using sticky back VELCRO tape. Similarly, a device may comprise magnetic sheets which may be used with or in place of conventional shelf paper or shelf liners in cupboards or pantries. See FIG. 6C.

One of skill in the art will appreciate that the ability to strategically place the devices/bait stations and magnets in different locations provides an advantage over prior art pest traps. For example, conventional attempts at rodent control often result in the rodent dying behind a wall or in some other inaccessible area after consuming a rodenticide. In contrast, it is contemplated herein that one or more magnets may be strategically placed in convenient locations for the collection of entrapped pests, while the device comprising the bait station may be placed in a different location, e.g., behind a wall or other location where pests are likely to consume the bait, but where collection of entrapped pests is inconvenient. In addition, the smell of a dead or decaying rodent in a trap can cause other rodents to shy away from a baited area. Thus, it is contemplated herein that a device of the instant invention may continue to attract numerous rodents to a bait station, while magnets for entrapping the pests may be placed elsewhere, e.g., along a possible path taken by the animal to get to the bait station.

Although the invention herein has been described with reference to particular embodiments, it is to be understood that these embodiments, and examples provided herein, are merely illustrative of the principles and applications of the present invention. It is therefore to be understood that numerous modifications can be made to the illustrative embodiments and examples, and that other arrangements can be devised without departing from the spirit and scope of the present invention as defined by the appended claims. All patent applications, patents, literature and references cited herein are hereby incorporated by reference in their entirety.

EXAMPLES

Proof of concept has been demonstrated using mosquitoes, house flies, ants and cockroaches as described in detail in the following examples. Notably, in each case, the insect did not have to feed very long, i.e., only a few minutes, before being trapped on the magnet which was situated close to the feeding source. Moreover, it was observed that the insects were able to ingest a sufficient quantity of the mixture during one feeding session to be entrapped by the magnet. It is believed that in these experiments the ferromagnetic powder cannot be expelled by the insect because it is held by the magnet and thus cannot move through the alimentary tract of the insects. The entrapped insects were unable to wriggle free from the magnets.

Example 1: Adult Mosquitoes

In one experiment, 25 adult mosquitoes (*Aedes aegypti*) were placed in a square enclosure approximately 5 inches in diameter by 8 inches high and fed a composition comprising a sweet berry fruit syrup (Wax Orchards Inc., Seattle, Wash.) in which was suspended 25% by weight of BAYOXIDE E 8707 H ferromagnetic powder (Lanxess Corp., Pittsburgh Pa.). The mixture was placed in a shallow glass dish approximately 2 inches in diameter and ¼ inch high. The particle size of the BAYOXIDE E 8707 H powder is 0.2 microns. The insect easily fed on the composition. A ½ inch wide, ⅛ inch high neodymium magnet having one pound pull strength was suspended approximately 3 inches from the top of the enclosure, hung by a filament. As the mosquitoes flew by the magnet they were attracted to it and captured by it.

Example 2: Fire Ants

In one experiment, 25 fire ants (*Solenopsis invicta*) were placed in a round enclosure approximately 8 inches in diameter and 4 inches high and fed a composition comprising a sweet berry fruit syrup (Wax Orchards Inc., Seattle, Wash.) in which was suspended 25% by weight of BAYOXIDE E 8707 H ferromagnetic powder (Lanxess Corp., Pittsburgh Pa.) The particle size of the BAYOXIDE E 8707 H powder is 0.2 microns. The ants were placed in an enclosure that had the sides coated with a fluoropolymer resin coating (PTFE-30) commercially known as FLUON or "Insect-A-Slip" (BioQuip Products Rancho Dominguez, Calif.) to prevent the ants from crawling out. The ferromagnetic bait composition was placed at the center of the enclosure. The mixture was placed in a shallow glass dish approximately 2 inches in diameter and ¼ inch high. The ants easily fed on the composition. A ½ inch wide, ⅛ inch high neodymium magnet having one pound pull strength was placed at an edge of the enclosure. The ants crawled around freely after feeding and when they passed within approximately 1 inch of the magnet, they were attracted to it and captured by it.

Example 3: House Flies

In this experiment, 25 house flies (*Musca domestica*) were placed in a square enclosure approximately 5 inches in diameter by 8 inches high and fed a composition comprising a sweet berry fruit syrup (Wax Orchards Inc., Seattle, Wash.) in which was suspended 25% by weight of BAYOXIDE E 8707 H ferromagnetic powder (Lanxess Corp., Pittsburgh Pa.) The mixture was placed in a shallow glass dish approximately 2 inches in diameter and ¼ inch high. The particle size of the BAYOXIDE E 8707 H powder is 0.2 microns. The flies easily fed on the composition. A ½ inch wide, ⅛ inch high neodymium magnet having one pound pull strength was suspended approximately 3 inches from the top of the enclosure, hung by a filament. As the flies flew within approximately 1 inch of the magnet they were attracted to it and captured by it.

In another experiment, 25 house flies (*Musca domestica*) were placed in a round enclosure 10 inches in diameter and 8 inches high and fed a composition comprising 60% by weight of a solid fly food mixture and 40% by weight BAYOXIDE E 8707 H ferromagnetic powder (Lanxess Corp., Pittsburgh Pa.) The particle size of the BAYOXIDE E 8707 H powder is 0.2 microns. The fly food mixture contained 40% Domino® brand extra fine granulated pure cane sugar (Publix Super Market Gainesville, Fla.), 40% instant milk powder (#41084 Natural Foods Inc., Toledo, Ohio), and 20% egg yolk powder (#40504 Natural Foods Inc., Toledo, Ohio). The mixture of the dry fly food and the dry magnetite were placed in an 8 oz. glass jar and placed on a roll mill for one hour to make a uniform mixture. The resulting mixture was placed in a shallow glass dish 2 inches in diameter and ¼ inch high and placed in the enclosure. A shallow glass dish 2 inches in diameter and ¼ inch high filled with water and floating particles of dry foam was also provided. The foam allows the flies to land and drink without drowning.

A ⅜"×¹⁄₁₆" inch disc-shaped neodymium rare earth magnet (Model M38×116D. Apex Magnets, Petersburg, W. Va.) having a 2.3 pound pull force was suspended by a filament approximately 3 inches from the top of the enclosure. The flies in the enclosure easily fed on the dry food composition. As the fed flies flew within 1 inch of the suspended magnet, they were attracted to it and captured by it. The flies were not able to escape under these conditions. Notably, in an earlier similar experiment using a one pound pull magnet, flies were able to pull themselves off the magnet.

Example 4: Cockroaches

In another experiment, 10 adult German cockroaches (*Blattella germanica*) were placed in a round enclosure approximately 8 inches in diameter and 4 inches high and fed a composition comprising a sweet berry fruit syrup in which was suspended 25% by weight of BAYOXIDE E 8707 H ferromagnetic powder (Lanxess Corp., Pittsburgh Pa.) The particle size of the BAYOXIDE E 8707 H powder is 0.2 microns. The cockroaches were placed in a dish that had the sides coated with a fluoropolymer resin coating (PTFE-30) commercially known as FLUON or "Insect-A-Slip" (BioQuip Products Rancho Dominguez, Calif.) to prevent the cockroaches from crawling out. The ferromagnetic bait composition was placed at the center of the dish. The mixture was placed in a shallow glass dish approximately 2 inches in diameter and ¼ inch high. The cockroaches easily fed on the mixture. A ½ inch wide, ⅛ inch high neodymium magnet having one pound pull strength was placed at an edge of the enclosure. The cockroaches crawled around freely after feeding and when they passed near the magnet, they were attracted to it and could not escape.

Example 5: Mosquito Larvae

A composition comprising 75% by weight TETRAMIN fish food (Spectrum Brands, Blacksburg, Va.) and 25% by weight BAYOXIDE E 8707 H ferromagnetic powder (Lanxess Corp., Pittsburgh, Pa.) were mixed to form a paste and allowed to dry to form a solid mixture which was subsequently pulverized into small flakes of about 20-50 microns in diameter. The particle size of the BAYOXIDE E 8707 H powder is 0.2 microns. The powder was fed to 25 mosquito larvae which were in a container of water. The powder was sprinkled on the water surface and allowed to settle to the bottom where the larvae were. After feeding for less than 30 minutes, the larvae were all attracted to a ½ inch wide, ⅛ inch high neodymium magnet having a one pound pull strength which was placed at the bottom of the water container. Since the larvae were not able to rise to the surface of the water to breathe, they all died.

Example 6: Rodents and Other Pests

It is contemplated herein that a variety of possible compositions comprising ferromagnetic particles can be formulated as bait and used to attract pests other than insects, e.g., vermin including but not limited to rodents, in accordance with the methods and devices of the invention. For example, such compositions may comprise a mixture of peanut butter and 25% by weight BAYOXIDE E 8707 H ferromagnetic powder (Lanxess Corp., Pittsburgh, Pa.). While the particle size of the ferromagnetic powder in BAYOXIDE E 8707 H is 0.2 microns, one of skill in the art will understand that ferromagnetic particles of larger dimension, e.g., up to approximately 500 microns or more may be used to trap rodents. In other examples, flour-based or corn meal-based compositions particularly enticing to rodents and further comprising ferromagnetic particles can easily be made and used as bait. For example, cakes of compositions comprising 1%-90% iron oxide powder, more specifically 10-70% iron oxide powder, may be formulated for use in the instant invention. Moreover, it is understood that a magnetic pull force larger than that necessary to immobilize an insect, e.g., greater than 1 pound pull strength, may be provided in order to trap a rodent. Depending on the size of the rodent or other pest to be entrapped, routine experimentation may be used to discern particularly preferred bait, weight percentage of ferromagnetic particles, and sufficient magnetic pull force.

What is claimed is:

1. A device for trapping a pest, said device comprising a housing comprising a frame comprising side walls, a top, and a base; one or more openings defined by the housing through which the pest may enter/exit the device; one or more bait stations comprising a bait composition comprising ferromagnetic particles to be ingested by the pest and further comprising a food material attractive to the pest to be ingested by the pest; and magnetic materials capable of attracting the ferromagnetic particles after ingestion by the pest; wherein said ferromagnetic particles are provided in an amount sufficient for ingestion by the pest of a quantity to cause immobilization of the pest with said magnetic materials; wherein said magnetic materials are physically affixed to the side walls, the top, and/or the base of the frame of the housing and/or impregnated in a material which is used to make the housing; and wherein the pest is selected from the group consisting of cockroaches, ants, flies, moths, mosquitoes and rodents.

2. The device of claim 1 wherein the bait composition comprises from about 1-80% by weight of the ferromagnetic particles.

3. The device of claim 2 wherein the bait composition comprises about 25% by weight of the ferromagnetic particles.

4. The device of claim 1 wherein the ferromagnetic particles are from about 0.01 microns to about 500 microns in size.

5. The device of claim 4 wherein the ferromagnetic particles are about 0.2 microns in size.

6. The device of claim 1 wherein the ferromagnetic particles are less than one micron in size.

7. The device of claim 1 wherein the ferromagnetic particles comprise one or more substances selected from the group consisting of iron (Fe), nickel (Ni), cobalt (Co), gadolinium (Gd), and magnetic alloys.

8. The device of claim 7 wherein the magnetic alloys are selected from the group consisting of nickel-iron alloys, nickel-cobalt-iron alloys, aluminum-nickel-cobalt alloys, copper-nickel-cobalt alloys, cobalt-platinum-manganese alloys, aluminum alloys, silver alloys, copper alloys, magnesium alloys, and manganese alloys.

9. The device of claim 1 wherein the ferromagnetic particles comprise magnetic oxides and/or ferromagnetic ferrites.

10. The device of claim 1 wherein the ferromagnetic particles are made of magnetite ($Fe_3O_4$).

11. The device of claim 1 wherein said magnetic materials are one or more magnets selected from the group consisting of permanent magnets and electromagnets.

12. The device of claim 11 wherein said permanent magnets are neodymium magnets.

13. The device of claim 1 wherein the device further comprises one or more substances which serve to attract the pest to the device.

14. The device of claim 13 wherein the one or more substances is a pheromone.

15. The device of claim 1 wherein the rodent is selected from the group consisting of mice and rats.

16. The device of claim 1 wherein said device further comprises other magnetic materials provided as separate components not physically part of the device; wherein said other magnetic materials are used to entrap the pest outside the device, said pest having exited the device after having ingested a meal comprising said ferromagnetic particles.

17. The device of claim 16 wherein said other magnetic materials provided as separate components are selected from the group consisting of magnets in the form of magnetic strips or sheets to be strategically placed near the bait station where the pest is likely to be found but where placing the bait station may not be practical; magnetic materials with self-adhesive backing to be strategically placed in cupboards, behind appliances, on pipes, in crawl spaces, affixed under counter tops or affixed vertically alongside appliances, walls or other structures where the pest might crawl; magnets to be affixed to a desired location using hook and loop fasteners or sticky back tape; and magnetic sheets to be used with or in place of conventional shelf paper or shelf liners in cupboards or pantries.

18. The device of claim 1 wherein the pest is a cockroach or an ant; wherein the bait composition is a viscous liquid or a suspension comprising 25% by weight of said ferromagnetic particles; wherein said ferromagnetic particles are magnetite ($Fe_3O_4$) particles about 0.2 microns in size; wherein said magnetic materials are one or more neodymium magnets having one pound pull strength; and wherein said one or more neodymium magnets are located on the side walls, top and/or on the base of the frame of the device.

19. The device of claim 18 wherein the device further comprises one or more substances which serve to attract the pest to the device.

20. The device of claim 19 wherein the one or more substances is a pheromone.

21. The device of claim 18 wherein said device further comprises other magnetic materials provided as separate components not physically part of the device; wherein said other magnetic materials are used to entrap the pest outside the device, said pest having exited the device after having ingested a meal comprising said ferromagnetic particles.

22. The device of claim 21 wherein said other magnetic materials provided as separate components are selected from the group consisting of magnets in the form of magnetic strips or sheets to be strategically placed near the bait station where the pest is likely to be found but where placing the bait station may not be practical; magnetic materials with self-adhesive backing to be strategically placed in cupboards, behind appliances, on pipes, in crawl spaces, affixed under counter tops or affixed vertically alongside appliances, walls or other structures where the pest might crawl; magnets to be affixed to a desired location using hook and loop fasteners or sticky back tape; and magnetic sheets to be used with or in place of conventional shelf paper or shelf liners in cupboards or pantries.

23. The device of claim 1 wherein the pest is an adult mosquito or a house fly; wherein the bait composition is a viscous liquid or a suspension comprising 25% by weight of said ferromagnetic particles; wherein said ferromagnetic particles are magnetite ($Fe_3O_4$) particles about 0.2 microns in size; wherein said magnetic materials are one or more neodymium magnets having one pound pull strength; and wherein said one or more neodymium magnets are suspended from the top of the frame of the device.

24. The device of claim 23 wherein the device further comprises one or more substances which serve to attract the pest to the device.

25. The device of claim 24 wherein the one or more substances is a pheromone.

26. The device of claim 23 wherein said device further comprises other magnetic materials provided as separate components not physically part of the device; wherein said other magnetic materials are used to entrap the pest outside the device, said pest having exited the device after having ingested a meal comprising said ferromagnetic particles.

27. The device of claim 26 wherein said other magnetic materials provided as separate components are selected from the group consisting of magnets in the form of magnetic strips or sheets to be strategically placed near the bait station where the pest is likely to be found but where placing the bait station may not be practical; magnetic materials with self-adhesive backing to be strategically placed in cupboards, behind appliances, on pipes, in crawl spaces, affixed under counter tops or affixed vertically alongside appliances, walls or other structures where the pest might crawl; magnets to be affixed to a desired location using hook and loop fasteners or sticky back tape; and magnetic sheets to be used with or in place of conventional shelf paper or shelf liners in cupboards or pantries.

28. The device of claim 1 wherein the pest is a house fly; wherein the bait composition comprises 60% by weight of a solid fly food mixture and 40% by weight of said ferromagnetic particles; where said solid fly food mixture comprises 40% extra fine granulated pure cane sugar, 40% instant milk powder and 20% egg yolk powder; wherein said ferromagnetic particles are magnetite ($Fe_3O_4$) particles about 0.2 microns in size; wherein said magnetic materials are one or more neodymium magnets having 2.3 pound pull strength and wherein said one or more neodymium magnets are suspended from the top of the frame of the device.

29. The device of claim 28 wherein the device further comprises one or more substances which serve to attract the pest to the device.

30. The device of claim 29 wherein the one or more substances is a pheromone.

31. The device of claim 28 wherein said device further comprises other magnetic materials provided as separate components not physically part of the device; wherein said other magnetic materials are used to entrap the pest outside the device, said pest having exited the device after having ingested a meal comprising said ferromagnetic particles.

32. The device of claim 31 wherein said other magnetic materials provided as separate components are selected from the group consisting of magnets in the form of magnetic strips or sheets to be strategically placed near the bait station where the pest is likely to be found but where placing the bait station may not be practical; magnetic materials with self-adhesive backing to be strategically placed in cupboards, behind appliances, on pipes, in crawl spaces, affixed under counter tops or affixed vertically alongside appliances, walls or other structures where the pest might crawl; magnets to be affixed to a desired location using hook and loop fasteners or sticky back tape; and magnetic sheets to be used with or in place of conventional shelf paper or shelf liners in cupboards or pantries.

33. A method of trapping a pest, said method comprising using the device of any one of claims 1, 2-12, 13, 14, 15, 16, 17-18, and 19-32.

* * * * *